(12) United States Patent
Fernandez et al.

(10) Patent No.: US 11,521,234 B2
(45) Date of Patent: Dec. 6, 2022

(54) ADAPTIVE VIDEO CONTENT DISPLAY USING EAS PEDESTALS OR SIMILAR STRUCTURE

(71) Applicant: Sensormatic Electronics, LLC, Boca Raton, FL (US)

(72) Inventors: Gilbert Fernandez, Weston, FL (US); Sergio M. Perez, Lake Worth, FL (US); Dario Passadore, Delray Beach, FL (US); Craig R. Szklany, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 17/107,114

(22) Filed: Nov. 30, 2020

(65) Prior Publication Data

US 2021/0081987 A1   Mar. 18, 2021

Related U.S. Application Data

(63) Continuation of application No. 15/418,362, filed on Jan. 27, 2017, now Pat. No. 10,853,841.

(60) Provisional application No. 62/288,511, filed on Jan. 29, 2016.

(51) Int. Cl.
*G06Q 30/00*    (2012.01)
*G06Q 30/02*    (2012.01)
*G08B 13/24*    (2006.01)

(52) U.S. Cl.
CPC ..... *G06Q 30/0251* (2013.01); *G06Q 30/0259* (2013.01); *G06Q 30/0269* (2013.01); *G08B 13/2451* (2013.01)

(58) Field of Classification Search
CPC .......... G06Q 30/0251; G06Q 30/0259; G06Q 30/0269; G08B 13/2451
See application file for complete search history.

(56) References Cited

U.S. PATENT DOCUMENTS

| 6,295,367 | B1 | 9/2001 | Crabtree et al. |
| 9,123,223 | B1* | 9/2015 | Fuhr .................... H04N 5/2256 |
| 9,159,116 | B2 | 10/2015 | Plagemann et al. |
| 9,363,155 | B1 | 6/2016 | Gravino et al. |
| 10,712,804 | B2 | 7/2020 | Singh et al. |
| 10,893,325 | B2 | 1/2021 | Cheong et al. |

(Continued)

OTHER PUBLICATIONS

DiLonrado, R.L., Defining and measuring the economic benefit of electronic article surveillance, Apr. 1996, Security Journal (Year: 1996).*

(Continued)

*Primary Examiner* — Matthew L Hamilton
(74) *Attorney, Agent, or Firm* — ArentFox Schiff LLP

(57) ABSTRACT

Adaptive system for communicating with a customer in a retail store environment includes a sensor disposed at a sensor location in a retail environment. The sensor location is selected so that the sensor captures information that facilitates identification of at least one trait associated with a customer located proximate to the sensor location. A processing system is configured to use the information to determine the at least one trait. Thereafter, in response to such determination, the processing system selectively determines a message or content selection to be displayed to the customer based at least in part on the at least one trait that has been identified.

17 Claims, 7 Drawing Sheets

(56) References Cited

U.S. PATENT DOCUMENTS

| | | |
|---|---|---|
| 2003/0088832 A1 | 5/2003 | Agostinelli et al. |
| 2003/0179229 A1 | 9/2003 | Van Erlach et al. |
| 2004/0001002 A1* | 1/2004 | Blum ................ A47L 23/22 340/573.1 |
| 2005/0198661 A1 | 9/2005 | Collins et al. |
| 2005/0229200 A1 | 10/2005 | Kirkland et al. |
| 2006/0184800 A1 | 8/2006 | Rosenberg |
| 2008/0004951 A1 | 1/2008 | Huang et al. |
| 2008/0004953 A1 | 1/2008 | Ma et al. |
| 2009/0198529 A1* | 8/2009 | Burkholder .......... G06Q 10/087 705/28 |
| 2011/0211738 A1 | 9/2011 | Eckhoff et al. |
| 2012/0013806 A1 | 1/2012 | Hsieh |
| 2013/0005443 A1 | 1/2013 | Kosta et al. |
| 2013/0124321 A1* | 5/2013 | Yamane ............ G06Q 30/0261 705/14.57 |
| 2013/0185148 A1* | 7/2013 | Townsend ............ G07F 9/009 705/14.49 |
| 2013/0198006 A1 | 8/2013 | Santhiveeran et al. |
| 2014/0002644 A1 | 1/2014 | Fedorovskaya et al. |
| 2014/0180790 A1 | 1/2014 | Boal |
| 2014/0100955 A1 | 4/2014 | Osotio et al. |
| 2014/0253706 A1 | 9/2014 | Noone et al. |
| 2014/0316875 A1 | 10/2014 | Tkachenko et al. |
| 2015/0066959 A1 | 3/2015 | Yi et al. |
| 2015/0264299 A1 | 9/2015 | Leech et al. |
| 2016/0078264 A1* | 3/2016 | Armstrong ......... G06K 7/10475 340/572.1 |
| 2016/0371722 A1 | 12/2016 | Maginnis |
| 2016/0379261 A1 | 12/2016 | Avalos et al. |
| 2017/0124603 A1* | 5/2017 | Olson .................... H04W 4/02 |
| 2017/0178190 A1 | 6/2017 | Wu |
| 2017/0249670 A1 | 8/2017 | Awad et al. |
| 2017/0278130 A1 | 9/2017 | Ao |
| 2018/0288392 A1 | 10/2018 | Hicks et al. |
| 2019/0180587 A1* | 6/2019 | Bergman ........... G08B 13/2474 |
| 2019/0304279 A1* | 10/2019 | Watkin .................. G08B 13/24 |
| 2019/0355019 A1 | 11/2019 | Takanashi et al. |
| 2020/0043312 A1* | 2/2020 | Reyes ................ G08B 13/2474 |
| 2021/0097823 A1* | 4/2021 | Miller ................ G06Q 30/0259 |
| 2021/0097832 A1 | 4/2021 | Bergman |
| 2021/0334831 A1 | 10/2021 | McLean |

OTHER PUBLICATIONS

Dressing Up EAS [Electronic Article Surveillance}, Oct. 2004, Cahners Publishing (Year: 2004).*

Reath, Donald R., Quality EAS Systems Expand Market Use, ASIS International, Aug. 1992 (Year: 1992).*

Longmore-Etheridge, A., The Evolution of EAS, 1998, Security Management (Year: 1998).*

Lottes, S, What's in Store with EAS, Security Management, Mar. 1992 (Year: 1992).

* cited by examiner

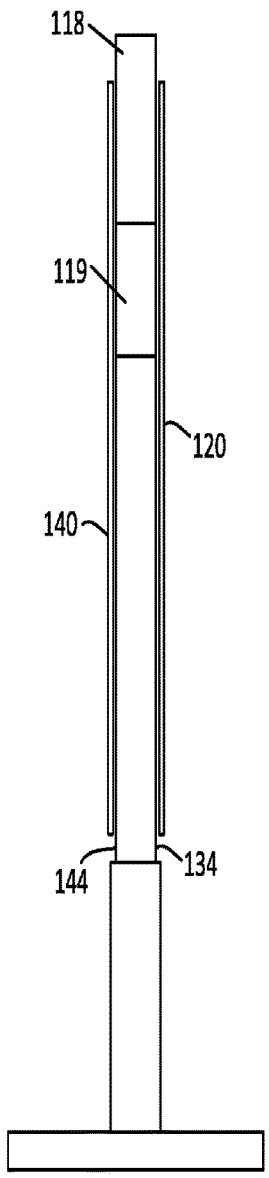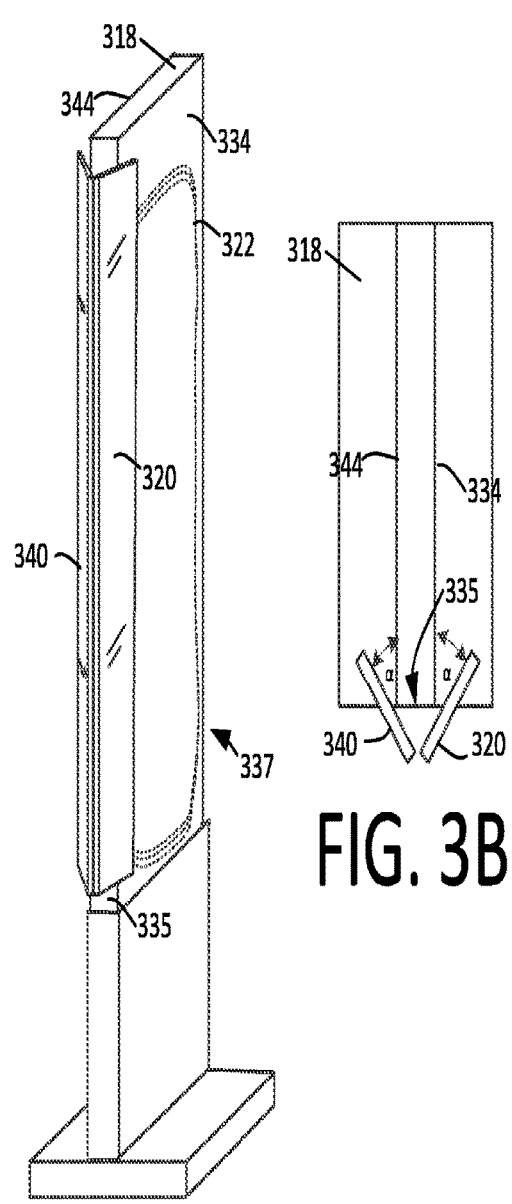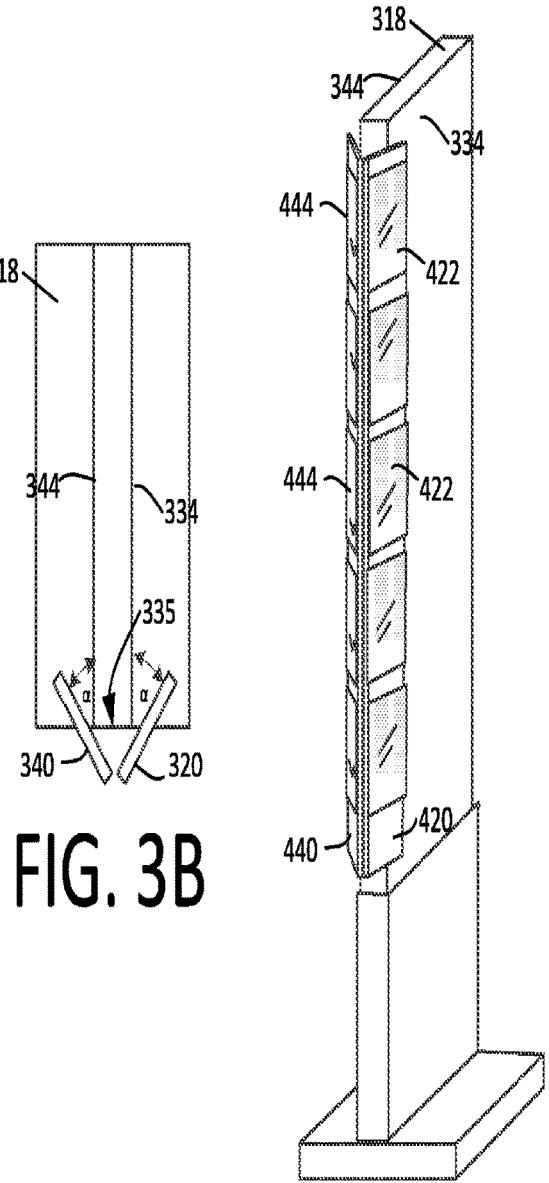
FIG. 2　FIG. 3A　FIG. 3B　FIG. 4

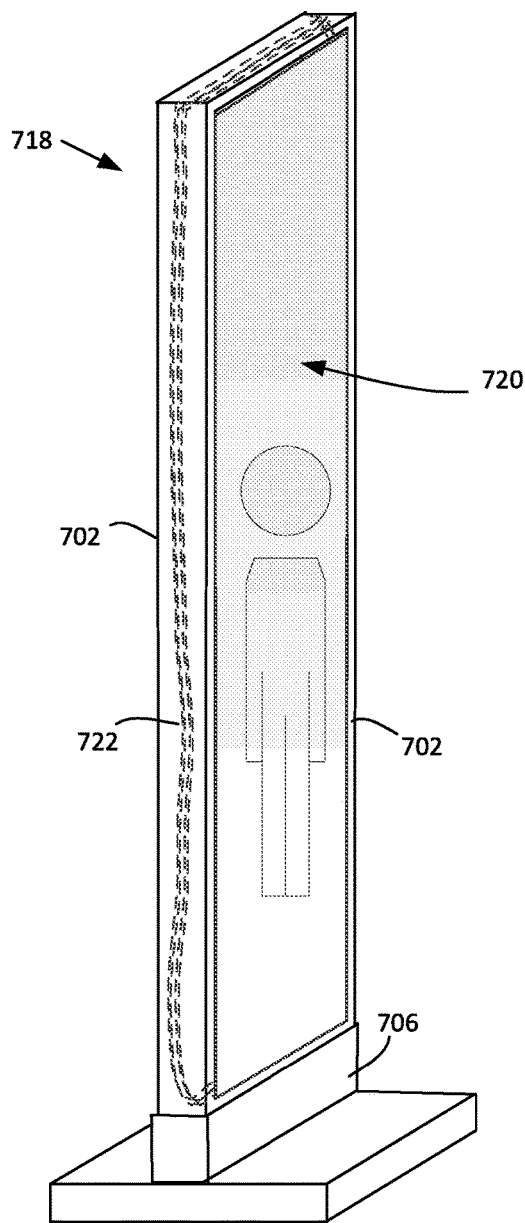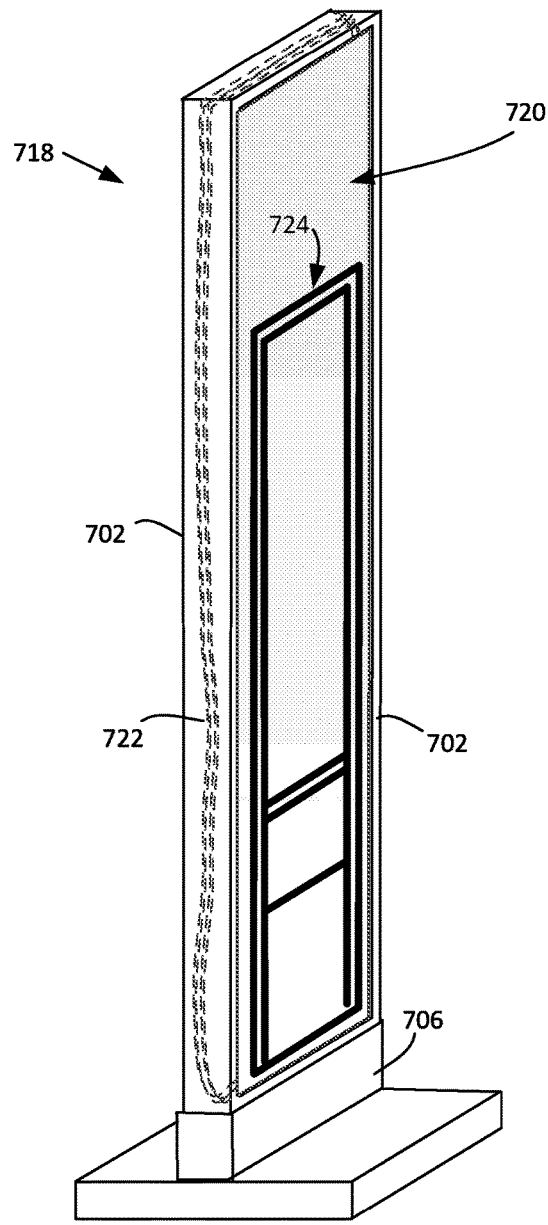
FIG. 8A
FIG. 8B

ADAPTIVE VIDEO CONTENT DISPLAY USING EAS PEDESTALS OR SIMILAR STRUCTURE

CROSS-REFERENCE TO RELATED APPLICATIONS

This application is a Continuation Application of U.S. Patent Application No. 15/418,362, filed on Jan. 27, 2017, which claims priority to U.S. Patent Application No. 62/288,511, filed Jan. 29, 2016. The contents of the above application are incorporated by reference in its entirety.

BACKGROUND OF THE INVENTION

Statement of the Technical Field

The inventive arrangements relate to systems for communicating with customers in a retail environment, and more particularly to dynamic and adaptive systems for communicating with customers.

DESCRIPTION OF THE RELATED ART

The range of technology being applied to retail store situations is rapidly growing. Electronic Article Surveillance (EAS) systems use various types of EAS tags to determine when products are being removed from a retail environment without authorization. Inventory control systems monitor product inventory available for sale and are often integrated with point-of-sale (POS) systems so that inventory can be monitored in real time. Customer relationship management (CRM) systems allow stores to track the identity and buying patterns of customers. Video cameras capture images showing in-store activity.

Facial recognition systems are growing in popularity for security reasons and other purposes. Such systems typically involve a video camera to collect a facial image and a video analytics system to determine identity based on facial characteristics.

But relatively few technological advances have been applied to the area of in-store customer communications and/or advertising. Conventional banners and signage are well known for purposes of promoting sales, brands and/or advertising of special offers. Electronic signage is sometimes used for this purpose as well. But conventional in-store signage and banners can suffer from several drawbacks. For example, each banner or sign can only communicate one message to all customers. Also, placement of such banners or signage can be challenging. Ideal placement should ensure that the message medium is disposed in a readily visible location to ensure visibility to customers. But the most ideal locations for such signage is near the entrance of the store, and these locations are prime retail space where retailers most want to present their products for sale. This is a particular problem with respect to electronic signage since the optimal locations may not be conducive to running power cords or control wiring.

SUMMARY OF THE INVENTION

Embodiments of the invention concern an adaptive system for directed advertising in a retail store environment. The system includes at least one sensor disposed at a sensor location in a retail environment. The sensor location is selected so that the sensor captures identifying information that facilitates identification of at least one trait associated with a customer located proximate to the sensor location. A processing system is configured to use the identifying information to determine the at least one trait. Thereafter, in response to such determination, the processing system selectively determines a message or content selection to be displayed to the customer based at least in part on the at least one trait that has been identified. A video display device is mounted at a location in the retail store environment which is visible to the customer proximate the sensor location. A data communication link is provided between the processing system and the display device. The data communication link can be a wired or wireless link. The video display device is configured so that it is responsive to data communicated from the processing system so as to display the message or content selection.

The at least one trait described herein is selected from the group consisting of an identity of the customer, a travel direction of the customer, and a demographic characteristic of the customer. In some scenarios, the demographic characteristic can be chosen to include one or more of an age, sex, and physical size of the customer. To facilitate determination of the trait information, the at least one sensor can be chosen to be a video camera and the identifying information may comprise a facial image of the customer. Of course the invention is not limited in this respect and other methods can also be used to identify the referenced trait. For example, electronic tags, or identifying information associated with a mobile device carried by a customer can also be used for this purpose.

According to one aspect, a plurality of traffic sensors can be situated at traffic detection locations within the retail environment. The plurality of traffic sensors in such a scenario are configured to communicate to the processing system customer traffic information at the various detection locations. The processing system will then choose the message or content selection for the display based at least in part on the customer traffic information within the retail store.

Many retail facilities also have an inventory control system which determines or tracks an inventory condition associated with a plurality of products offered for sale in the retail environment. In such a scenario, the processing system which controls the display messaging or content can be configured to receive inventory tracking information from the inventory control system. Further, the processing system can be arranged to choose the message or content selection for display based in part on the inventory condition of one or more of the plurality of products.

Once a particular customer has been identified based on trait information, the message or content selection chosen to be displayed can be tailored or adjusted so that it is optimally suited for a particular customer. For example, the message or content selection can comprise a customer greeting which includes a specific reference (e.g. a customer's name) which is unique to the customer. Suitable audio components (such as loudspeakers and audio amplifiers) can be provided proximate to the video display device. In such scenarios, the message or content selection can include an audio message. For example, the message or content can include an audio greeting such as a verbal greeting that includes the customer's name.

A video display as described herein can be disposed anywhere in or around a portal location where customers can enter a retail store. However, it can be particularly advantageous to provide the video display device so that it is integrated into an EAS pedestal. Accordingly, the space occupied by the EAS pedestal is put to a dual use for security and targeted advertising. Further, the at least one sensor described above can be integrated into or disposed on the EAS pedestal so as to minimize clutter and distraction at the entry to the retail store.

According to one aspect, the video display described herein can be a flat panel display that is disposed on or integrated into a first major surface of the EAS pedestal. A video camera can be arranged to capture a scene which is directly behind the EAS pedestal, facing a second major surface of the EAS pedestal opposed from the first major surface. In such a scenario, the video camera can be disposed in the pedestal to capture the scene from the vantage point of the pedestal. The video camera output can be controlled or directed so that it is displayed on the video display. This arrangement can facilitate camouflaging of the EAS pedestal by causing the pedestal to appear to be transparent when not being used for messaging or other purposes. In other words, the scene from behind the display which is hidden by the video display panel is captured by the video camera and displayed on the video display.

BRIEF DESCRIPTION OF THE DRAWINGS

Embodiments will be described with reference to the following drawing figures, in which like numerals represent like items throughout the figures, and in which:

FIG. 2 is a drawing which is useful for understanding an EAS pedestal for use with an adaptive advertising system including a dual panel video display.

FIGS. 3A and 3B are a set of drawings which are useful for understanding an EAS pedestal for use with an adaptive advertising system in which one or more video displays are disposed on an end cap of the pedestal.

FIG. 4 is a drawing which is useful for understanding an EAS pedestal for use with an adaptive advertising system in which a plurality of display devices are aligned along a vertical end cap of the pedestal.

FIGS. 8A and 8B are a set of drawings which are useful for understanding how a display presented on an EAS pedestal can be selectively modified under certain conditions.

DETAILED DESCRIPTION

Figure 1:
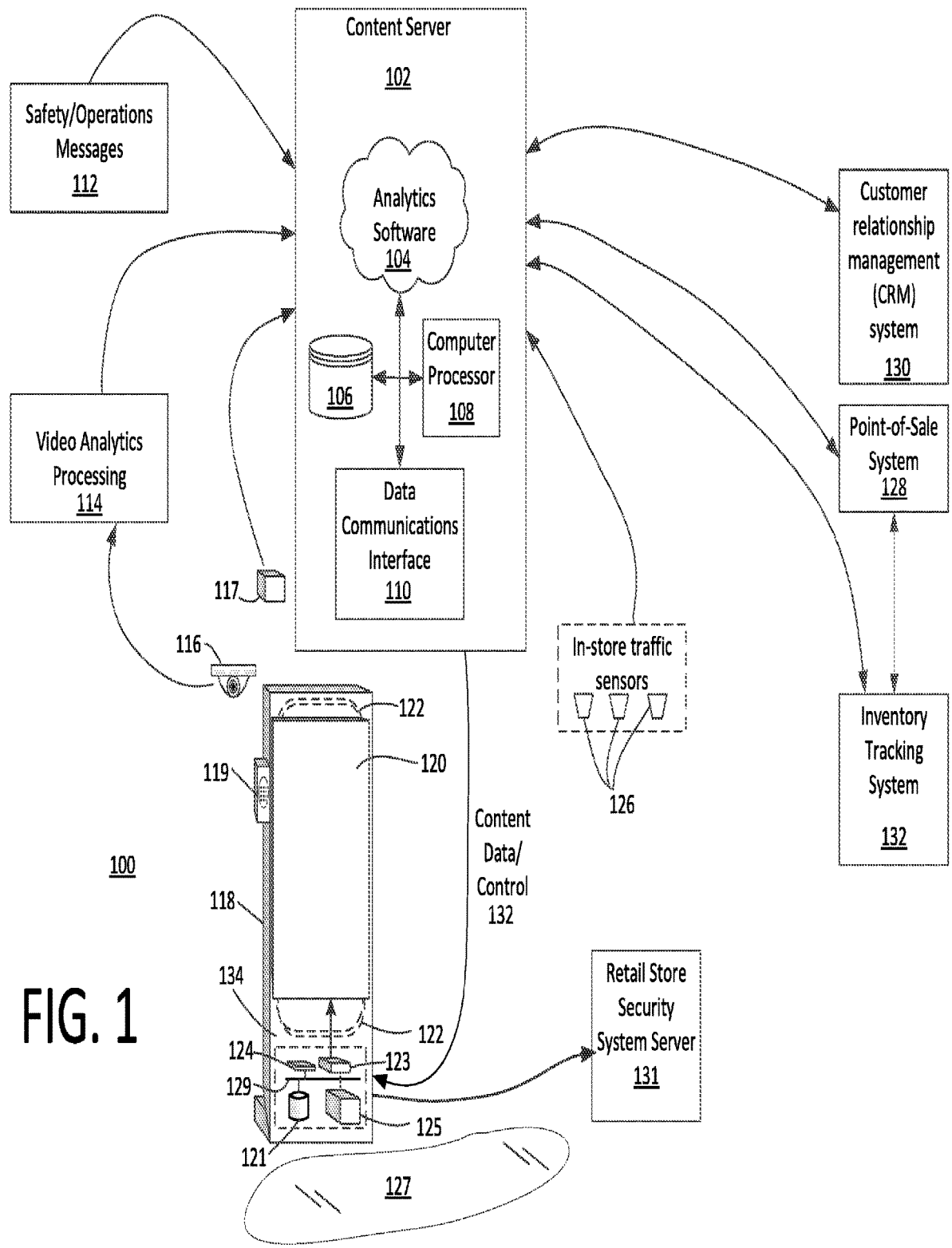
FIG. 1 is a conceptual diagram of an adaptive advertising system that is useful for understanding the invention.

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. However, the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

The embodiments concern methods and systems for implementing adaptive targeted advertising at a portal or entry associated with a retail store, using a processing system, sensor inputs and a video monitor. According to one aspect, the video monitor in such a system can be advantageously integrated into an EAS pedestal.

A conventional EAS system will commonly use one or more EAS pedestals for detecting EAS tags at a portal location associated with a retail store environment. The pedestal will commonly house magnetic coils or antenna elements by which a reader will excite or interrogate EAS tags passing through a portal area. The portal area is usually located in areas of the store where customers enter and exit the store premises. Accordingly, advertising on EAS pedestals is highly advantageous. After all, EAS pedestals reside in a prime location; usually at the very front of the store where all customers enter and/or exit the store. But the prime location also dictates that EAS pedestals should be unobtrusive and not brought to the attention of customers. For this reason many retailers have opted to employ aesthetically pleasing pedestals and to forgo the limited advertising opportunity.

Presently there are no EAS pedestals regardless of technology (AM, RF or RFID) in the industry that incorporate video and audio or video advertising. Adding video and/or video with audio advertising can be the ultimate solution to the EAS advertising dilemma. Having the opportunity and the ability to provide a large video monitor for advertising integrated with EAS pedestals can revolutionize the way retailers use and invest in EAS technology According to an embodiment disclosed herein, an adaptive targeted advertising system (ATAS) can selectively provide or generate a video advertising feed containing content from a variety of product manufacturers and brands. These can include companies involved in a wide variety of businesses such as the apparel, cosmetic, electronic, food trade, who are eager to increase sales revenue. The video advertising feed can be dynamically varied in accordance with certain conditions described herein. In some scenarios, the video advertising feed can be a live video feed containing live actors and/or computer generated representations of live actors. The particular messages which are displayed can be selected from a rotation, based on time of day, or based on other criteria described below. By targeting the efforts directly at the store entrance were shoppers are trafficking, a dramatic increase in sales can potentially be achieved. At the same time, the retailer can potentially generate income from advertisement. The result is a boost in sales for the retailers, a more efficient form of advertising and an increase in revenue. These considerations can in turn lead to wider adoption of EAS systems due to the fact that investment in security (i.e. EAS pedestal) can now pay for itself plus generate added income from advertising revenue and sales.

If the ATAS is coupled with a facial recognition system (or other sensors sufficient to allow identification of the customer), then customized customer greetings are possible. In such a scenario, the processing system can generate or select message content which includes or references customers by name. Moreover, when coupled to a facial recognition system or other sensors, advertisements can be displayed which are specifically targeted to individual customers based on demographic characteristics, prior purchasing preferences and/or shopping habits.

Following recognition of a customer, the EAS pedestal described herein can facilitate further customer relationship management functions. For example, the pedestal could audibly annunciate a voice greeting which specifically mentions the name of the identified customer for a more personalized shopping experience. Suitable audio components (speakers, audio amplifiers) can be provided proximate to the video display device to facilitate such voice greeting.

In its simplest form, a voice greeting as described herein can be a greeting such as "Good morning Mr. Smith and welcome to XYZ Department Store." However, it can be advantageous for the EAS pedestal to go a step further and function in the manner of a customer service representative by audibly asking the customer if they need assistance. For example, the EAS pedestal could be configured to annunciate (using machine generated speech) a suitable question such as "Can I help you find something Mr. Smith?" In such a scenario, the EAS pedestal can further incorporate an audio transducer (e.g., a microphone) to convert an audible spoken response of a customer to an electronic signal. The EAS pedestal and/or a remote server in communication with the EAS pedestal would advantageously incorporate a speech recognition engine. As is known, a speech recognition engine can convert the audible spoken words of a person to text or data. In this case, the audible spoken words of the customer at the EAS pedestal would be detected by the audio transducer, and then converted to text or data by the speech recognition engine. The text or data can then be analyzed by processing means at the pedestal or remote server so to determine a suitable response.

For example, suitable artificial intelligence (AI) can be provided at the EAS pedestal or a remote server so as to generate an appropriate response after the customer has stated their shopping needs. In such a scenario, the EAS pedestal (or the remote server comprising the AI) could provide a machine generated voice response which responds to the customer's inquiry and/or directs the customer to a particular location in the store where the desired product(s) can be found. The machine generated response could then be reproduced at the EAS pedestal as machine generated speech by using the available audio components. Thereafter, the process can continue further with the AI causing the EAS pedestal to inquire whether the customer has any further needs, and the customer speaking to the EAS pedestal to annunciate further specific inquiries.

When two or more EAS pedestals as described herein are provided at a particular portal location, audio transducers (speakers, microphones) can be provided at each pedestal. Audio processing circuitry or software-based algorithms can then be used to determine which direction (and/or which EAS pedestal) the customer is facing towards. The foregoing information is useful to facilitate directing audio and visual response to the appropriate EAS pedestal. If a customer is not facing a particular EAS pedestal, then the system will be aware that such EAS pedestal is available for audio and/or visual interaction with another customer. A customer position or orientation detected in this way can also be useful for directing the customer to the correct location in the retail store. For example, if a customer orientation is known, a machine generated response could specify left or right directionality (e.g. " . . . the item you are looking for is located in the third shopping aisle on your right . . . ").

According to a further aspect, the customized messaging provided at the EAS pedestal can be based on other considerations. For example, information from inventory intelligence systems can be used by a processing system to selectively generate advertisements for products which are overstocked. Advertisements for products which become depleted from inventory can be temporarily removed from the rotation which is displayed.

According to a further aspect, information from customer traffic monitors disposed through the store and or current point-of-sale information (rate of customer purchases) can be used to evaluate the relative number of customers visiting various departments within a retail store. When departments with low customer volume are identified by the processing system, those departments can be promoted to encourage customer to visit those departments.

As a further possibility, the video monitor can be used to facilitate camouflaging of the EAS pedestal. In such a scenario, a video camera can capture a scene behind an EAS pedestal and display the scene on a video monitor which is disposed on an opposing side of the pedestal. Such an arrangement can cause the EAS pedestal to appear transparent when not being used for messaging or other purposes.

Although it is highly advantageous to mount a video display on an EAS pedestal as described herein, it should be appreciated that the various embodiments are not limited in this regard. In some ATAS embodiments, the video display panel can be positioned above or adjacent to the EAS pedestal. As a further alternative, the video display can be positioned at an location which is proximate to the entrance of a retail store facility so that it can be visible by customers entering the store.

Turning now to FIG. 1, there is provided a conceptual diagram of an Adaptive Targeted Advertising System (ATAS) 100 which is useful for understanding certain features of the various embodiments. The drawing shows an EAS pedestal 118 disposed at a portal location associated with a retail store environment. The portal location will generally be an entrance or exit where customers enter and/or depart from the retail store facility. A single EAS pedestal 118 is shown to simplify the drawing, but it should be understood that two or more such EAS pedestals are commonly used together at a retail store portal to facilitate EAS functions.

EAS systems including EAS pedestals are well known in the art and therefore will not be described here in detail. However, it should be noted that the EAS pedestal 118 can be any type of EAS pedestal such as may be used to implement detection of one or more EAS tags (not shown) in a portal zone 127. As such, the EAS pedestal can be designed to detect EAS tags of various types such as acousto-magnetic (AM) tags, radio frequency identification (RFID) tags and so on. As is known, an EAS pedestal in an EAS system is commonly used to house an EAS antenna 122. The exact type of the antenna 122 will depend on the nature of the EAS tags to be detected. An exemplary antenna type used for AM tags can comprise a wire loop formed of a plurality of coil turns, which are excited by an EAS transmitter disposed in the pedestal. Still, embodiments are not limited in this regard and other antenna types are possible.

The EAS pedestal can further include an EAS system controller 125 configured to carry out various functions as described herein. For example, the system controller 125 can include an EAS transmitter, an EAS receiver and EAS processing/control circuitry. The function and operation of EAS transmitter, EAS receiver, and EAS processing/control circuitry components are well known in the art and therefore shall not be described here in detail. However, it will be appreciated that these components are arranged to detect the presence of EAS tags in a portal zone to prevent unauthorized removal of merchandise from store premises.

In some scenarios, the system controller 125 can communicate with other components of an ATAS system by means of a data communication network (not shown). For example, in an embodiment disclosed herein, the EAS system controller 125 can be configured to communicate with various retail store system components such as a centralized retail store security system server 131 and/or a content server 102 as described below. Such data network communications can be facilitated by means of a computer data network card 124 which is communicatively coupled to the EAS system controller. The computer data network card 124 can be configured to communicate over the computer data network using conventional wired or wireless data network communication protocols.

As shown in FIG. 1, at least one video display 120 is disposed on or integrated within the EAS pedestal. Suitable audio components 119 can also be provided at the pedestal to facilitate reproduction of audio content as hereinafter described. Such audio components can comprise audio interface circuitry, audio amplifier circuitry, and one or more loudspeakers (not shown). Still, the embodiments are not limited in this regard and the audio components can comprise additional features as well.

The EAS pedestal 118 can further include a content processor 123 which is operatively connected to the at least one video display 120 and/or the audio components 119. In FIG. 1, the content processor 123 is shown as a module that is separate from the EAS system controller 125. However, in some scenarios, the content processor 123 can be integrated partially or completely in the EAS system controller 125. An internal data bus 129 can be provided within the EAS pedestal to facilitate communications between the computer data network card 124, the EAS system controller 125, and the content processor 123.

In some scenarios, the audio components 119 and the video display 120 can be located proximal to and within line of sight of the portal zone 127, but not directly integrated with the EAS pedestal. In that case, it may be advantageous for the content processor 123 to be located proximal to the video display and operatively connected therewith to facilitate the adaptive advertising methods described herein.

The content processor 123 facilitates several functions relating to presentation of audio and/or video content at the EAS pedestal by means of the video display 120 and/or audio components 119. These functions will be described in greater detail as the discussion herein progresses.

The content processor 123 can have shared access to computer data network card 124. As noted above, the computer data network card 124 can be configured to communicate over the computer data network using conventional data network communication protocols. Alternatively, such data network communications can be facilitated by means of a computer data network interface device (not shown) which is integrated with and/or exclusively accessed by the content processor module 123. Such data network communications can include wired and/or wireless network communications.

The ATAS 100 includes a content server 102. The content server can comprise a computer processor 108, a data store 106 and a data communication interface 110. Content server 102 uses analytics software 104 and certain data contained in data store 106 to facilitate an adaptive process for selecting video, and/or audio-video content to be presented with the video display 120 and/or audio component 119. For convenience, such video and/or audio-video content is sometimes referred to herein as simply "content". The content server 102 uses the data communication interface 110 for wired or wireless data network communications with to communicate the selected content to the content processor module 123. The content processor module 123 is responsive to content data and control signals 132 from the content server 102 to cause the content to be displayed and/or reproduced using the video display 120 and audio component 119.

The content server can select content to be displayed based simply on predetermined criteria such as time of day, or a predetermined advertising rotation. However, the ATAS 100 described herein can instead utilize a wide range of retail store information to dynamically determine such content. The information used for this purpose can be derived from one or more retail store components or systems. These can include a video analytics (facial recognition) processing component 114, in-store traffic sensors 126, customer relationship management system component 130, a point-of-sale system component 128, an inventory tracking component 132, and a safety/operational message server 112. One or more of these systems can comprise stand-alone computer systems or servers which communicate with the content server 102 by means of a computer network interface (e.g. data communication interface 110). However, embodiments are not limited in this regard and in some scenarios it can be advantageous to integrate one or more such components into a common server or set of servers. For example, in some scenarios, one or more of the functional aspects of such components can be integrated into the content server 102.

According to one aspect, an ATAS 100 as described herein can advantageously include at least one sensor to facilitate adaptive content selection. The sensor can be disposed at a sensor location in the retail environment to facilitate adaptive selection of advertising to be presented using the video display 120 and/or audio components 119. In an exemplary embodiment shown in FIG. 1, the at least one sensor is a video camera 116, but it should be understood that other types of sensors are also possible as hereinafter described. The location of the sensor is advantageously selected so that the sensor captures certain information concerning customers who are present in the portal zone and/or proximate to the sensor location. The information obtained in this way is of a type and nature to facilitate identification of at least one trait associated with a customer or potential customer in a retail establishment. Examples of such information can include an image of the customer's face, an image of the customer's body size and type, an age, or other physical characteristic of the person. A computer processing system is configured to use the captured information to determine the at least one trait associated with the customer. Thereafter, in response to such determination, the content server 102 selectively determines a message or content selection to be displayed to the customer based at least in part on the at least one trait that has been identified.

The at least one trait described herein can be selected from the group consisting of an identity of the customer, a travel direction of the customer (into the store versus out of the store), and a demographic characteristic of the customer. In some scenarios, the demographic characteristic can be chosen to include one or more of an age, sex, and physical size (petite, plus-size) of the customer. Once such information for the customer has been determined, suitable content can be selected that is specific to the individual. For example, different content (advertisements, greetings, offers) can be presented to women versus men or adults versus children.

To facilitate determination of the trait information, the at least one sensor can be chosen to be a video camera 116 and the identifying information may comprise a facial image or other physical attributes (e.g., physical size and/or sex) of the customer. A video analytics processing component 114 can be used to identify customers in this way by applying a facial recognition algorithm and/or a body analysis algorithm to the images captured by the video camera 116. Of course the embodiments are not limited in this respect and other methods can also be used to identify the referenced trait.

For example, instead of (or in addition to) using a video camera as the sensor to acquire the information concerning the customer, one or more wireless data network transceivers 117 can be used as sensors to identify certain information associated with a mobile device carried by a customer. For example in a wireless data network which is compliant with one or more of the IEEE 802 family of wireless networking standards, it is common for user devices to expose their Media Access Control (MAC) address to the network when in communication range. In such scenarios, the MAC address or other identifying information associated with the mobile device can be compared to a database 106 containing customer information so as to determine the identity of the person.

A database 106 can contain information which relates one or more customer device MAC addresses to the identity of specific customers who are known to the retailer. In some scenarios, the information in such database can be provided or facilitated by means of a customer relationship management (CRM) system 130. Once the customer has been identified, the analytics software can query the database 106 for additional trait information (age, sex, interests, physical size (petites versus large sizes), shopping patterns, and so on) which can be used to select content to be presented on the video display 120.

The message or content to be presented on video display 120 and/or audio components 119 can be selected or modified by the content server 102 so that it is optimally suited for a particular customer. For example, the message or content selection can be modified to comprise a customer greeting which includes a specific reference (e.g. a customer's name) which is unique to the customer. Suitable audio components 119 (speakers, audio amplifiers) can be provided proximate to the video display device to help present the content when the content selection includes an audio component. For example, in some scenarios, the content can include an audio greeting such as a verbal greeting that includes the customer's name.

In some embodiments, the actual content which is communicated to the customer using the video display 120 and/or audio components 119 can be communicated from the content server 102 to the content processor 123 as it is needed. However, in some embodiments, it can be advantageous for at least a portion of such content to be stored in a data store 121, located at the EAS pedestal. In such scenarios, the content server 102 need not be constantly communicating bandwidth consuming audio/video data content to the content processor 123 across the data network. Instead, the content server 102 can simply specify one or more audio/video data files contained in data store 121 which are to be played on command or in accordance with a specified play list. The video data files contained in the data store 121 can be periodically updated as needed. For example, such updating can occur during times data traffic on the network is minimal and/or after the store is closed when the ATAS system is otherwise inactive. Audio video files can be loaded into the data store 121 remotely from the content server 102 so that they are available when needed.

According to one aspect, a plurality of traffic sensors 126 can be situated at various different traffic detection locations within the retail environment. The traffic sensors in such a scenario are configured to communicate with the content server to provide customer traffic information detected at the various detection locations. Additional information concerning the degree of activity in different departments based on the rate of transactions being processed by the point-of-sale system 128 in association with different departments. The content server 102 will then use analytics software 104 to choose the message or content for the display based at least in part on the customer traffic information within the retail store. For example, the content server may choose to present content which is designed to direct customers to areas of the store that are experiencing low traffic. This content can be selected in part based on customer identification, demographic data, and/or trait information. For example, if the tool department and ladies shoe department are both experiencing low traffic, male customers may receive a message promoting the tool department, whereas female customers may receive a message promoting the ladies shoe department.

Many retail facilities also have an inventory control or tracking system 132 which determines or tracks an inventory condition associated with a plurality of products offered for sale in the retail environment. Such inventory tracking systems may operate in conjunction with a point-of-sale system 128 to monitor inventory in real time. Accordingly, the content server 102 can be configured to receive inventory tracking information from the inventory control system. In such scenarios, the content server 102 can be arranged to choose the content for presentation to a customer based in part on the inventory condition of one or more of the plurality of products which are available for sale at the particular retail store location. For example, if an overstock of one particular product exists, then the content can be dynamically selected to promote that product. When inventor of such item falls too low, the content can be altered to direct customers to similar or substitute products which are available.

A video display 120 as described herein can be disposed anywhere in or around a portal zone 127 where customers can enter a retail store. However, it can be particularly advantageous to provide the video display device so that it is integrated into an EAS pedestal. Accordingly, the space occupied by the EAS pedestal 118 is put to a dual use for security and adaptive targeted advertising. Further, the sensors 116, 117 described above can be integrated into or disposed on the EAS pedestal so as to minimize clutter and distraction at the entry to the retail store.

According to one aspect, the video display 120 described herein can be a flat panel display that is disposed on or integrated into a first major surface 134 of the EAS pedestal. Such an arrangement is illustrated in FIG. 1. In a first alternative embodiment shown in FIG. 2, a second video display 140 can be disposed on or integrated into a second major surface 144 of the EAS pedestal 118 so that video displays are provided on both major sides of the pedestal. In a second alternative embodiment shown in FIG. 3, one or more video displays 320, 340 can be disposed along a first minor surface of an EAS pedestal 318 comprising an end cap 335. The end cap 335 can be understood to include a surface which extends between the first major surface 334 and a second major surface 344 of the EAS pedestal as shown. The first and second major surfaces will generally be the surfaces of the pedestal which are arranged parallel to the plane defined by a loop or coil of wire comprising a loop antenna 322.

According to one aspect, the one or more video displays 320, 340 can each extend in a direction which is transverse to the first and second major surfaces. For example, in some embodiments, the video displays 320, 340 can extend in directions which form an angle α with respect to each of the first and second major surfaces, where the angle is between about 25° to 45°. In another embodiment, the angle α can extend be between 45° and 75°. Still, in other scenarios, a single video display 320 can be positioned on the end cap 335 to form an angle of about 90° with respect to each of the first and second major surface.

In the embodiment shown in FIGS. 3A and 3B the video displays are disposed on only a single end cap 335. However, it should be appreciated that embodiments are not limited in this regard. Instead, one or more additional video displays can be similarly disposed on an opposing end cap 337. In each embodiment disclosed herein, the video content of each of the displays can be determined by the content server operating in coordination with the content processor.

Video displays which have a non-standard aspect ratio (the relationship between its length and width) can be more expensive to obtain commercially. Accordingly, it can be advantageous in some embodiments to replace a single display 320 or 340 with a plurality of smaller sized displays which have a more conventional aspect ratio. Such an embodiment is shown in FIG. 4 in which each display panel 420, 440 is respectively comprised of a plurality of individual flat panel video displays 422, 444 which are stacked along the length of each display panel to facilitate an elongated display. In some embodiments, each of the flat panel video displays 422, 444 can be stacked end to end with minimal space between them to mimic an appearance of a single display panel. The content of the flat panel displays 422, 444 can be coordinated to form a single coherent display or can be operated independently to form a plurality of separate display elements.

Figure 5:
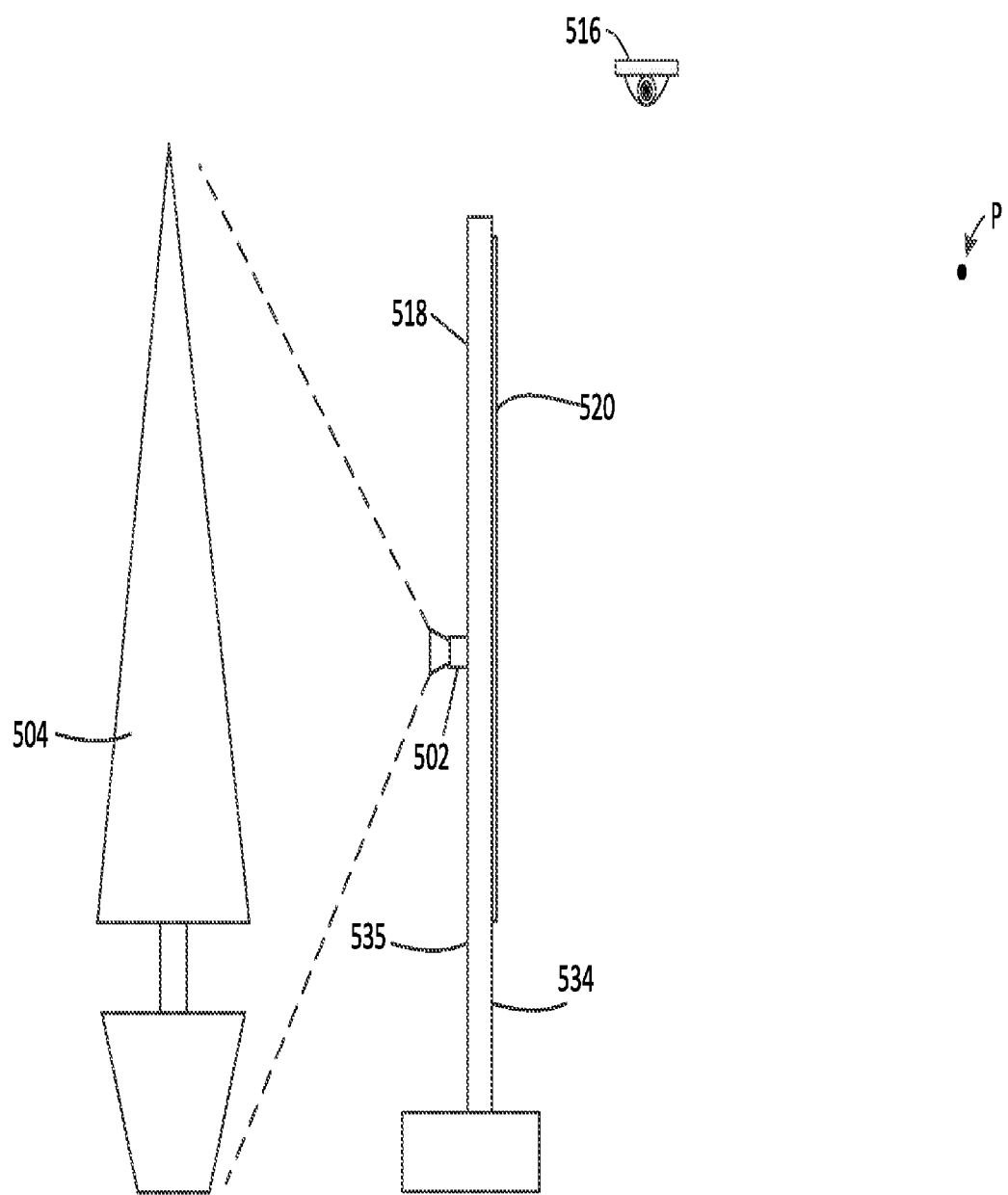
FIG. 5 is a drawing showing an EAS pedestal of the adaptive advertising system that is useful for understanding a method of making an EAS pedestal appear transparent.

Referring now to FIG. 5, a further embodiment is illustrated in which a video camera 502 can be arranged to capture a scene 504 which is directly behind the EAS pedestal, e.g., facing a second major surface 535 of the EAS pedestal opposed from the first major surface 534. In such a scenario, the video camera 502 can be disposed in or on the pedestal 518 to capture the scene 504 from the vantage point of the pedestal. The video camera output can then be controlled or directed by the content server 102 and/or content processor 123 so that it is displayed on the video display 520. This arrangement can facilitate camouflaging of the EAS pedestal by causing the pedestal to appear to be virtually transparent when not being used for messaging or other purposes. In other words, the scene in the field of view of the video camera 502 from behind the display (which is hidden from point P by the video display panel) is captured by the video camera and displayed on the video display so it may be observed from vantage point P.

The exact location of the video camera 502 and the direction in which the camera is pointed is advantageously selected to achieve an optimal camouflage effect when viewed from the point P. Notably, point P can be selected so that it corresponds to an approximate location from which customers of average height will view the scene 504, given a height of their eyes above ground and likely approach direction. But in some embodiments, the location of one or more approaching customers can be tracked (e.g., using video camera 516 and a video analytics processor 114).

In such a scenario, the video analytics processor can estimate a position of the customer relative to the video display based on their position in a captured visual scene. The video analytics processor can then use the captured image to estimate an approximate viewing angle of the customer. This estimate can be based on location alone but can also be based on an estimated physical factor, such as the height of the person. The content server and/or the content processor can then automatically adjust the image displayed on the video display 520 to optimize the effect, given the location and/or eye height of the user. For example, different portions of a larger captured image can be displayed on the video display based on the approximate viewing angle. In some embodiments, the camouflage effect can be dynamically optimized using these techniques as the customer moves and approaches the pedestal 518, so as to maintain the illusion. In embodiments such as those shown in FIGS. 3A, 3B and 4, the angle of the video camera 502 can similarly be modified to optimize the camouflage effect.

Figure 6:
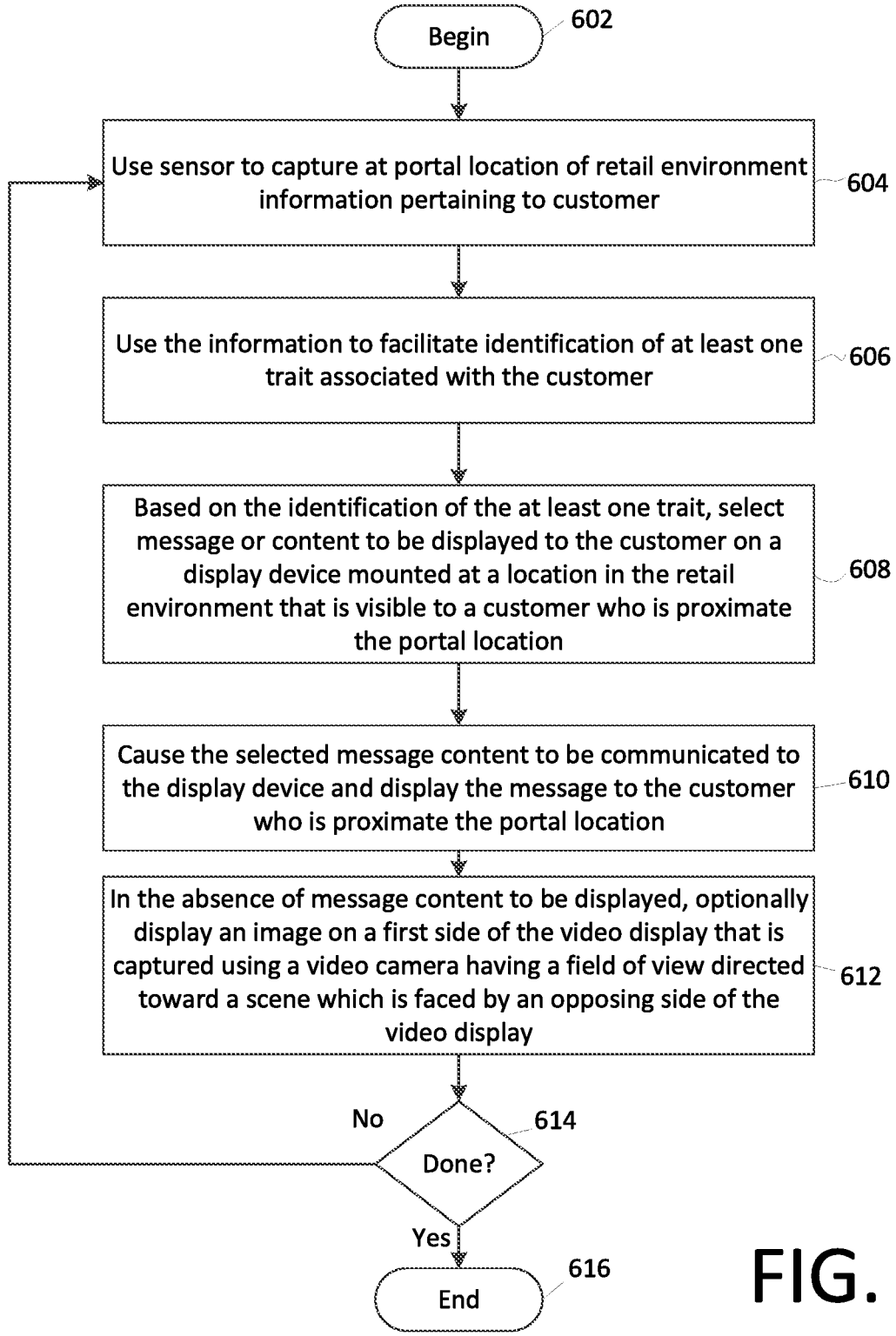
FIG. 6 is a flowchart that is useful for understanding a method for implementing an adaptive targeted advertising system (ATAS).

Referring now to FIG. 6, there is shown a flowchart that is useful for understanding an adaptive customer messaging process for communicating with customers in a retail store environment. The process begins at 602 and continues to 604 where a sensor is used at a portal location of a retail environment to capture certain information pertaining to approaching customers or persons.

At 606, this information is used to facilitate identification of at least one trait associated with the customer. For example, the at least one trait described herein can be one or more of an identity of the customer, a travel direction of the customer, and a demographic characteristic of the customer. In some scenarios, the demographic characteristic can be chosen to include one or more of an age, sex, and physical size of the customer. Based on the identification of the at least one trait, the process continues at 608 to select a message or content to be displayed to the customer on a display device. As noted above, the device can be mounted at a location in the retail environment that is visible to a customer who is proximate the portal location, such as on or in an EAS pedestal. At 610, the process continues by communicate the selected message content to the display device and then display the message to the customer who is proximate the portal location. Step 612 is an optional step. In the absence of detecting a customer, the process at step 612 optionally involves displaying an image on a front side of the video display. The image is one which is concurrently captured using a video camera having a field of view facing a rear side of the video display. Accordingly, when the video display is disposed on or in an EAS pedestal, the pedestal can seem to disappear by blending into the background. At 614 a determination is made as to whether the process is done. If not, the process returns to step 604; otherwise the process terminates at 616.

Figure 7A:
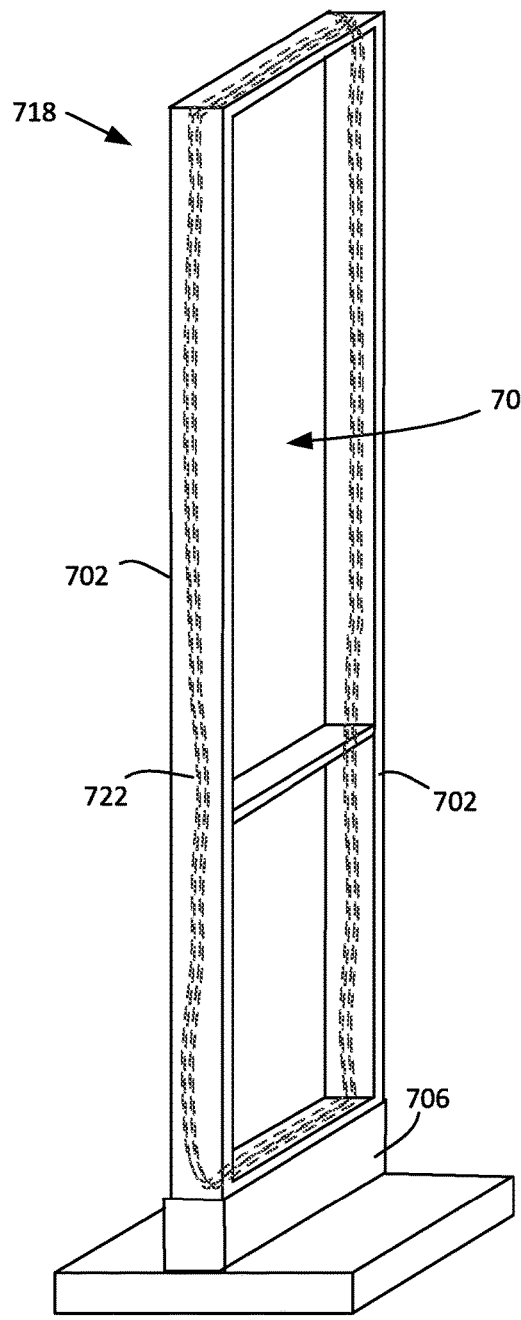
FIGS. 7A and 7B are a set of drawings which are useful for understanding how a video display can be integrated with a skeletonized EAS pedestal.
Figure 7B:
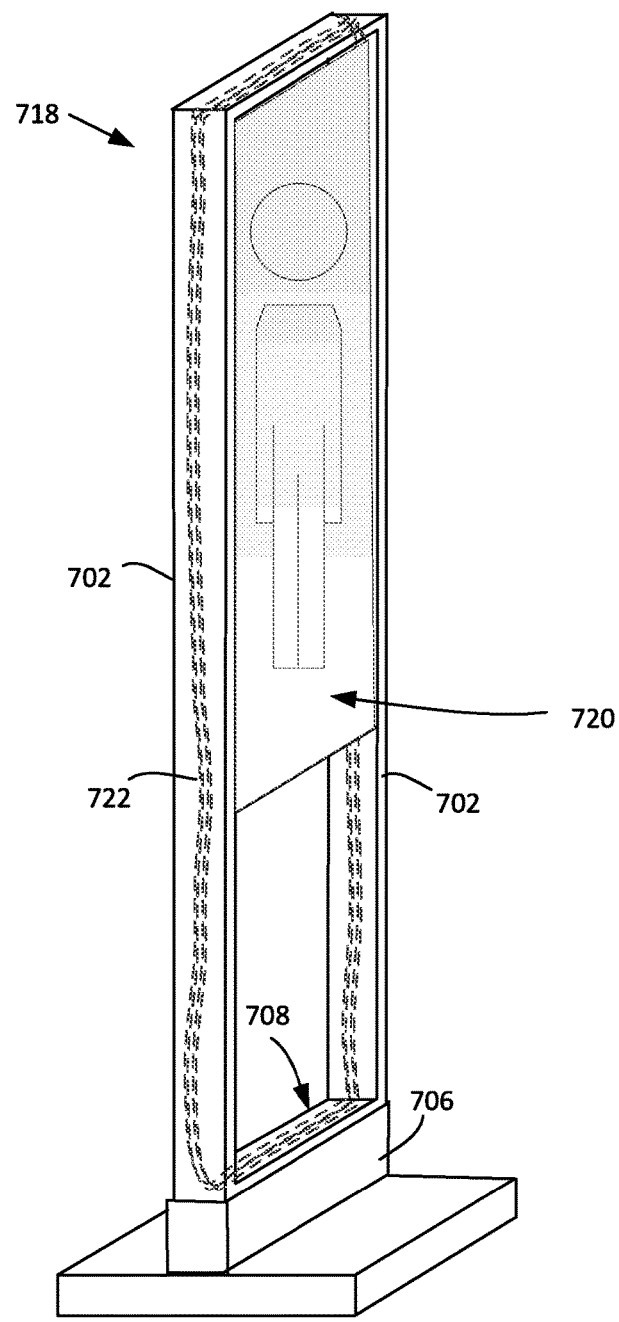

Referring now to FIG. 7A, it can be observed that a skeletonized EAS pedestal 718 can house an antenna 722 comprising a plurality of antenna coils inside plastic covers 702 that extend around a periphery of the pedestal 700 as shown. An EAS system controller (including EAS transmitter, receiver and control circuitry) can be disposed in a base 706 of the pedestal. Similarly, the pedestal base can contain a content processor and related components as described herein in relation to FIG. 1. This can leave a large open aperture inside the peripheral plastic covers 702. In an embodiment disclosed herein, the available space within the open aperture can be advantageously utilized by disposing a video monitor or display within the peripheral plastic covers. Such an arrangement is illustrated in FIG. 7B, which shows an EAS pedestal 718 having a video monitor 720 disposed within limits defined by the plastic covers 702 that extend around a periphery of the pedestal and contain the EAS coils.

FIG. 7 shows a video monitor disposed in an upper area of the space 704 only, but it should be understood that the invention is not limited in this regard. Instead, other monitor configurations are also possible. For example, rather than residing only in a portion of the aperture 704, the monitor can optionally extend partially or fully toward the upper portion 708 of the pedestal base 706. Such an arrangement is shown in FIGS. 8A and 8B. Also, it should be appreciated that the EAS technology in use in each scenario is not limited to AM or RFID type systems. Instead, any EAS system now known or known in the future can be integrated with the pedestal and used as described herein.

There are some scenarios where it can be desirable to imply to consumers that an EAS system is in use at a portal location associated with a retail store environment. In such scenarios, a processing system may selectively choose to display graphic content which has the appearance of a conventional EAS pedestal. Such an arrangement is illustrated in FIGS. 8A and 8B, which show that a display pedestal 718 with integrated video monitor 720 can be caused to display content as shown in FIG. 8B so as to create an appearance that mimics or implies the presence of a conventional EAS pedestal. For example, the displayed content 724 can comprise an image, outline or icon representative of a conventional EAS pedestal. In fact, an EAS antenna/monitoring system may or may not be present in the particular display pedestal 718. Instead, a different EAS monitoring system (or no monitoring system at all) may be in use. For example, an EAS antenna (e.g. an RFID antenna) may be installed above the portal location of pedestal 718. As an alternative (or in addition) to displaying an image, outline or icon that is representative of an EAS pedestal, the displayed content 724 can comprise an anti-theft warning text, symbol or notification.

The transition from various advertising content to the displayed content 724 can occur dynamically in response to certain conditions. For example, a content processor (e.g. content processor 123) can be responsive to a signal from the EAS system controller 125 indicating that an EAS tag is present in a portal zone which is monitored by the pedestal. When such a signal is received, the content processor can interrupt displayed content (e.g. advertising content or messaging) which is currently being displayed to customers and instead cause the displayed content 724 to be presented on the video monitor.

Referring once again to FIG. 1, there are some scenarios in which it can be advantageous to discourage customers or persons from spending excessive amounts of time in a portal zone 727 adjacent to a pedestal 718. Presentation of content (especially video content) on a EAS mounted video display can be counter-productive to this goal. Consequently, the ATAS system 100 can be configured to detect when customers are present in a portal zone 127. For example, imagery from the video camera 116 can be analyzed in video analytics processor 114 to determine when customers are present in the portal zone 127 adjacent to the pedestal 118. When such presence is detected, the video content can be temporarily interrupted. In some embodiments, the screen can remain blank during such periods of time. Alternatively, during such times, the displayed content 724 can optionally be presented. Such displayed content 724 will be of little visual interest to customers and therefore will not encourage their continued presence in the portal zone 127 for extended periods of time. Of course, embodiments are not limited in this regard and other content can also be displayed during such times, provided that it does not engage the customer or otherwise encourage them to remain in the portal zone 127. For example, a store logo could be displayed during such times. Alternatively, the camouflage techniques described in relation to FIG. 5 could be used to make the pedestal less obtrusive.

It should be understood that while conventional video monitor technology can be used to integrate a display into an EAS pedestal, the invention is not limited in this regard. Instead, any other suitable display technology can be used for this purpose. For example, instead of an actual video monitor, it may be preferable in some scenarios to integrate a passive reflective display screen onto which a video image can be projected. Such an arrangement can have several advantages for avoiding the placement of video monitors in the area of the EAS pedestal which is normally associated with intense magnetic and/or electro-magnetic fields. The video images can be projected onto the EAS pedestal using a video projector from above, behind or in front of the EAS pedestal. According to a further alternative, the EAS pedestal can comprise a holographic display element.

Figure 9:
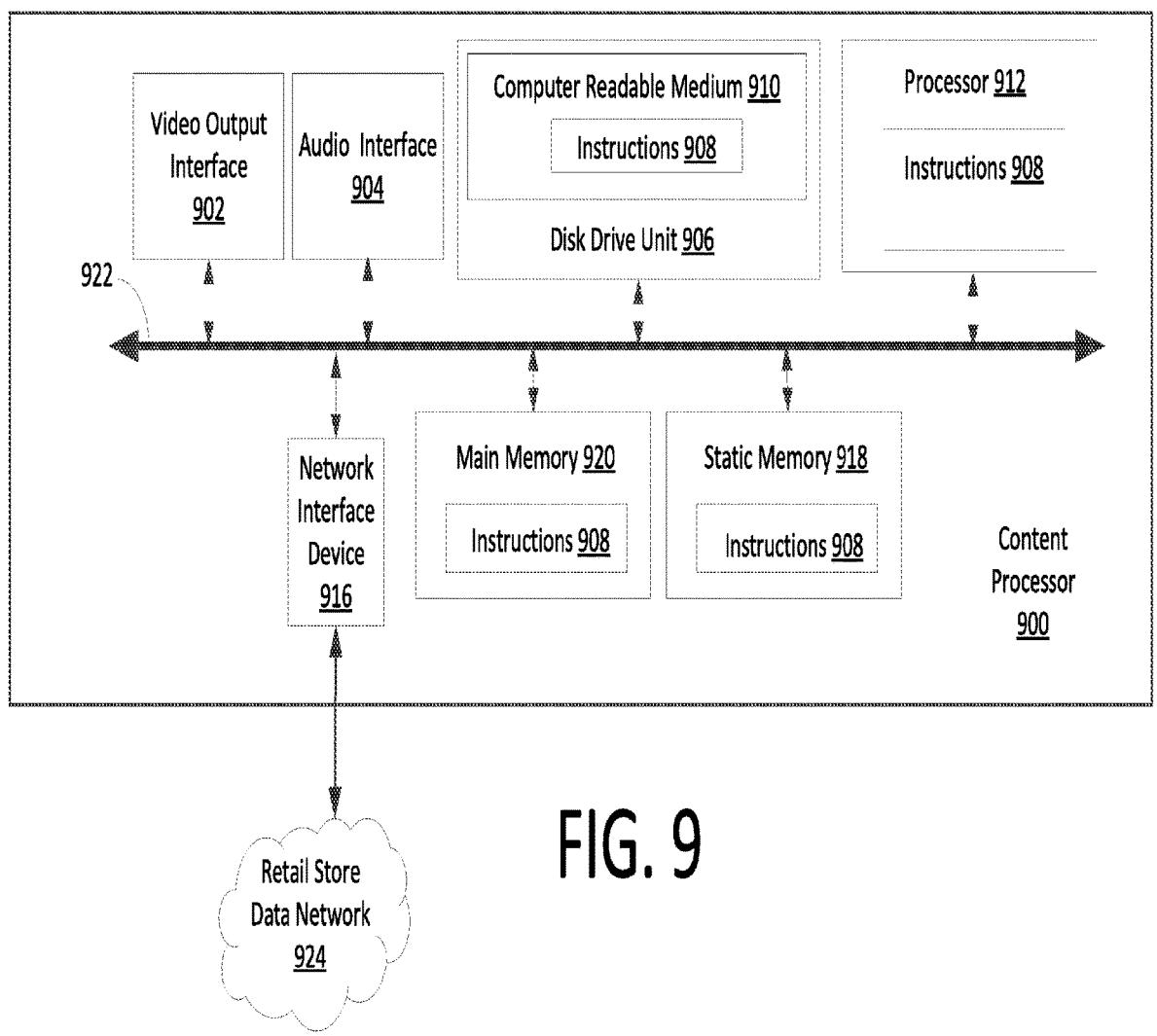
FIG. 9 is a block diagram which is useful for understanding an architecture of a content processor which is used in connection with an ATAS system.

Referring now to FIG. 9, a content processor 900 includes a processor 912 (such as a central processing unit (CPU), a graphics processing unit (GPU, or both), a disk drive unit 906, a main memory 920 and a static memory 918, which communicate with each other via a bus 922. The content processor 900 can further include a video output interface 902 for outputting video content to video display unit, an audio interface 902 for communicating audio to one or more audio components. The audio interface 902 can optionally be configured to include an audio input interface for receiving audio from a microphone to facilitate speech recognition. As such, the video output interface and audio output interface can comprise analog and/or digital circuitry. The content processor 900 can further include a network interface device 916 to facilitate communications with a computer data network.

The disk drive unit 906 includes a computer-readable storage medium 910 on which is stored one or more sets of instructions 908 (e.g., software code) configured to implement one or more of the methodologies, procedures, or functions described herein. The instructions 908 can also reside, completely or at least partially, within the main memory 920, the static memory 918, and/or within the processor 912 during execution thereof. The main memory 920 and the processor 912 also can constitute machine-readable media.

Those skilled in the art will appreciate that the content processor architecture illustrated in FIG. 9 is one possible example of a content processor. However, embodiments are not limited in this regard and any other suitable content processor architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments, certain methods described herein are stored as software programs in a computer-readable storage medium and are configured for running on a computer processor. Furthermore, software implementations can include, but are not limited to, distributed processing, component/object distributed processing, parallel processing, virtual machine processing, which can also be constructed to implement the methods described herein. In the various embodiments of the present invention a network interface device 916 connected to a retail store network environment 924 communicates over the network using the instructions 908.

While the computer-readable storage medium 910 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical mediums such as a disk or tape. Accordingly, the disclosure is considered to include any one or more of a computer-readable medium as listed herein and to include recognized equivalents and successor media, in which the software implementations herein are stored.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

We claim:

1. A system for controlling a video display in a retail store, comprising:
    an electronic article surveillance (EAS) pedestal comprising the video display, the video display integrated into a first surface of the EAS pedestal and operative to display information communicated to the video display;
    a camera arranged on a second surface of the EAS pedestal opposite the first surface, the camera configured to capture a scene directly behind the EAS pedestal; and
    a processing system in communication with the video display and the camera, the processing system operative to:
        receive store information;
        determine, based on the store information, whether to display content in the video display;
        communicate the content to the video display upon determining to display the content based on the store information; and
        communicate one or more images from the camera to the video display upon determining not to display the content based on the store information, wherein the one or more images capture the scene directly behind the EAS pedestal.

2. The system of claim 1,
    wherein the store information comprises an inventory condition of one or more of a plurality of products offered at the retail store; and
    wherein determining the content to be displayed on the video display based on the store information comprises selecting the content to be displayed based at least in part on the inventory condition.

3. The system of claim 1,
    wherein the store information comprises customer traffic data for each of at least one department of the retail store; and
    wherein determining the content to be displayed on the video display based on the store information comprises selecting the content to be displayed based at least in part on the customer traffic data for each of the at least one department of the retail store.

4. The system of claim 3, wherein the content directs customers to one or more departments of the retail store based at least in part on the customer traffic data.

5. The system of claim 4, wherein the content directs the customers to a department of the retail store having lower customer traffic than other departments of the retail store.

6. The system of claim 1,
    wherein the store information comprises point-of-sale (POS) data of the retail store; and
    wherein determining the content to be displayed on the video display based on the store information comprises selecting the content to be displayed based at least in part on the POS data of the retail store.

7. The system of claim 6, wherein the content directs customers to at least one department of the retail store based at least in part on the POS data.

8. The system of claim 1,
    wherein the store information comprises customer relationship management data; and
    wherein determining the content to be displayed on the video display based on the store information comprises selecting the content to be displayed based at least in part on the customer relationship management data.

9. A method for controlling a video display in a retail store, comprising:
    receiving, by a processing system, store information;
    determining, by the processing system, based on the store information, whether to display content on the video display mounted on a first surface of an electronic article surveillance (EAS) pedestal;

communicating, by the processing system, the content to the video display upon determining to display the content based on the store information; and communicating, by the processing system, one or more images from a camera to the video display upon determining not to display the content based on the store information, wherein the camera is arranged on a second surface of the EAS pedestal opposite the first surface, the camera configured to capture a scene directly behind the EAS pedestal and the one or more images capturing the scene directly behind the EAS pedestal.

10. The method of claim 9, wherein the store information comprises an inventory condition of one or more of a plurality of products offered at the retail store; and wherein determining the content to be displayed on the video display based on the store information comprises selecting the content to be displayed based at least in part on the inventory condition.

11. The method of claim 9, wherein the store information comprises customer traffic data for each of at least one department of the retail store; and wherein determining the content to be displayed on the video display based on the store information comprises selecting the content to be displayed based at least in part on the customer traffic data for each of the at least one department of the retail store.

12. The method of claim 9, wherein the store information comprises point-of-sale (POS) data of the retail store; and wherein determining the content to be displayed on the video display based on the store information comprises selecting the content to be displayed based at least in part on the POS data of the retail store.

13. The method of claim 9, wherein the store information comprises customer relationship management data; and wherein determining the content to be displayed on the video display based on the store information comprises selecting the content to be displayed based at least in part on the customer relationship management data.

14. A computer program product for controlling a video display in a retail store, comprising a non-transitory computer-readable storage device having computer-executable program instructions embodied thereon that when executed by a computer cause the computer to:

receive store information;

determine, based on the store information, whether to display content on the video display mounted on a first surface of an electronic article surveillance (EAS) pedestal;

communicate the content to the video display upon determining to display the content based on the store information; and communicate one or more images from a camera to the video display upon determining not to display the content based on the store information, wherein the camera is arranged on a second surface of the EAS pedestal opposite the first surface, the camera configured to capture a scene directly behind the EAS pedestal and the one or more images capturing the scene directly behind the EAS pedestal.

15. The computer program product of claim 14, the store information comprises an inventory condition of one or more of a plurality of products offered at the retail store; and wherein in order to determine the content to be displayed on the video display based on the store information, the computer-executable program instructions when executed by the computer further cause the computer to select the content to be displayed based at least in part on the inventory condition.

16. The computer program product of claim 14, wherein the store information comprises customer traffic data for each of at least one department of the retail store; and wherein in order to determine the content to be displayed on the video display based on the store information, the computer-executable program instructions when executed by the computer further cause the computer to select the content to be displayed based at least in part on the customer traffic data for each of the at least one department of the retail store.

17. The computer program product of claim 14, wherein the store information comprises customer relationship management data; and wherein in order to determine the content to be displayed on the video display based on the store information, the computer-executable program instructions when executed by the computer further cause the computer to select the content to be displayed based at least in part on the customer relationship management data.

* * * * *